April 2, 1946. H. M. DODGE 2,397,847
FLUID SEAL
Filed Dec. 11, 1943
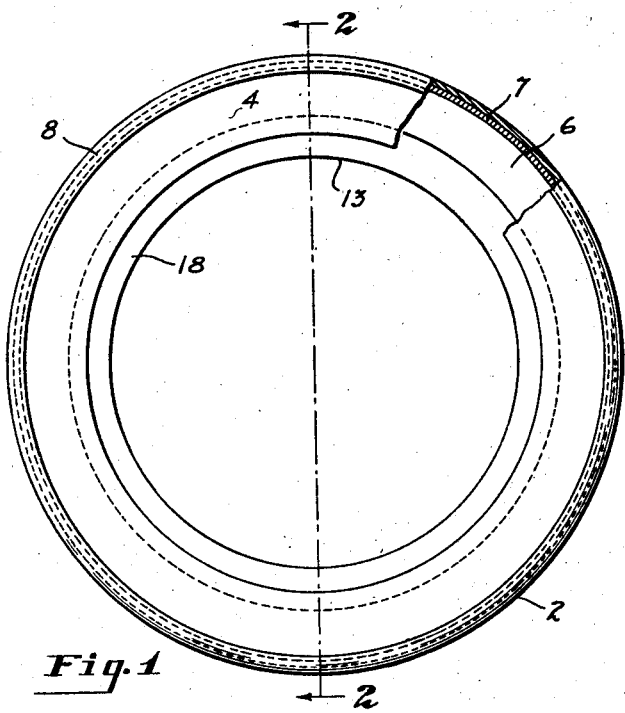
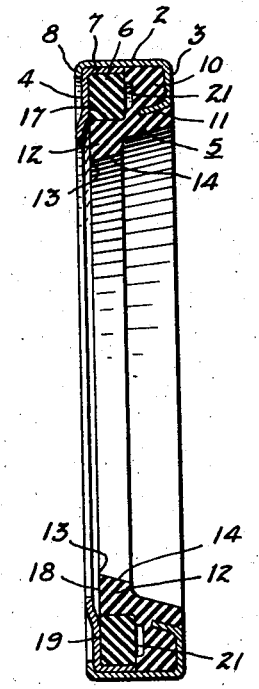
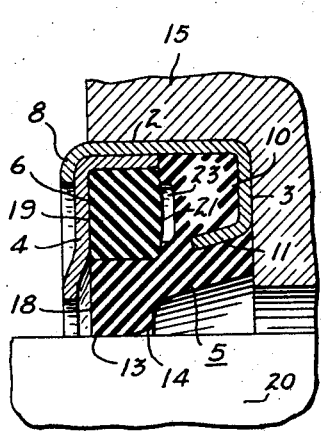
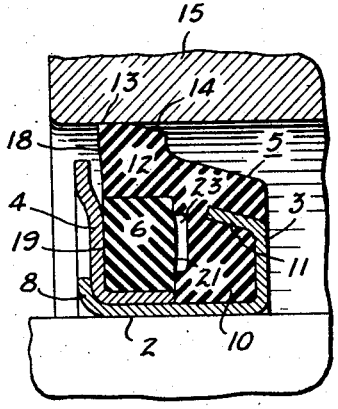
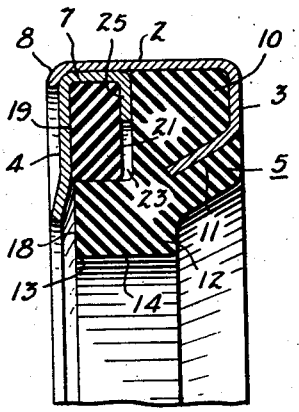
INVENTOR.
Howard M. Dodge
BY
Evans & McCoy
ATTORNEYS Patented Apr. 2, 1946

2,397,847

UNITED STATES PATENT OFFICE 2,397,847

FLUID SEAL

Howard M. Dodge, Wabash, Ind., assignor to The General Tire & Rubber Company, Akron, Ohio, a corporation of Ohio Application December 11, 1943, Serial No. 513,837

7 Claims. (Cl. 288—3)

This invention relates to improvements in machinery packing of a type which is especially adapted for use in preventing the escape of fluids or lubricants from joints between movable parts of machine elements and in extruding dust and other foreign matter from bearings or lubricated parts needing such protection.

The grease seals heretofore proposed have usually contained one or more metallic spring members which press against sealing members of leather, rubber or the like. While such oil seals when properly assembled have usually been effective, it has often been difficult to properly center the component parts of the seal so that uniform pressure was obtained over the entire sealing edges.

Oil and grease seals which do not contain metallic springs have many inherent advantages over seals in which the metallic springs press against the sealing member. Oil seals heretofore proposed, using an annular mass of relatively resilient rubber as a spring to press against the sealing member, have not, however, been entirely satisfactory. In one type where a relatively heavy ring of a resilient rubber is prevented from increasing in circumference by a close fitting casing, it is exceedingly difficult to obtain the desired concentration of pressure at the sealing edge or lip of the seal. This is apparently because a block of rubber acts as an incompressible fluid and has as is well known a substantially greater resistance to compression at its mid-portion than adjacent its edges unless the edges are restrained from bulging. Another type, wherein the pressure is applied by a small band of rubber floating on the edge of the lip of the seal, is often not desirable because there is a substantial tendency for the diameter of the small band to increase in size due to the swelling of the rubber in use, and with the stiff non-swellable stocks the sealing pressure and resilience may be insufficient. Such seals are also not operable as external seals having the sealing edge at their outer periphery.

In my prior Patent 2,319,941 and in my prior application, Serial No. 417,517, filed November 1, 1941, (Pat. 2,345,588, issued April 4, 1944), I disclosed oil seals wherein the desired concentration of sealing pressure on the sealing lip is obtained by a compression member of flexible rubberlike material, which is so disposed against the sealing element that it is subjected to a cantilever type of movement to give, upon deflection of the seal, increased pressure at the sealing lip. While such seals are in general satisfactory, at very high speeds and with eccentric shafts it may not always be desirable to have relative movement between the pressure member and the sealing element.

It has now been found that a concentration of pressure in the region of the free end of the sealing lip may also be obtained by providing a resilient member of rubberlike material which bears against an outer surface of a lip of a sealing element, and which is circumferentially restrained and laterally confined over only a portion of its lateral face on one side and for substantially its entire lateral face on the other side which side is adjacent the free edge of the sealing lip of the sealing element, so that substantially the greatest sealing pressure is applied in the region of the edge of the sealing lip.

My improved seals are illustrated by the accompanying drawing, in which:

Figure 1 is a side elevational view, with parts broken away, of a seal embodying the present invention;

Fig. 2 is a sectional view, on the line 2—2 of Fig. 1;

Fig. 3 is a sectional view through a portion of a seal embodying the present invention disposed within a bore in a housing, and having its sealing lip portion of the seal in contact with a suitable shaft;

Fig. 4 is a sectional view through a modified form of seal embodying the present invention, showing the sealing lip portion in sealing contact with the housing and with the metal casing in oil-tight contact with the shaft; and Fig. 5 is an elevational view, partly in section, of a portion of a modified form of seal embodying the present invention.

Referring particularly to the drawing, in which like parts are designated by the same numerals of reference throughout the several views, the seals of the present invention have a metal casing which is generally U-shaped in cross section and which has a cylindrical portion 2 with a diameter such that it may be fixedly held in oil-tight relation with one of two relatively movable machine elements, such as a housing or a shaft. Connected to the cylindrical portion 2 and preferably extending substantially radially from one side edge portion thereof, is an anchoring portion 3 to which a portion of the sealing element 5 is anchored and preferably bonded by suitable rubber-to-metal adhesion. Spaced from the anchoring portion 3, the casing has an annular confining portion 4 which also preferably extends in a substantially radial direction from an edge of the cylindrical portion 2 and serves as rigid restraining means for confining substantially the entire lateral face of the relatively soft, rubber-like, resilient pressure member 6 to give special properties to the pressure member 6 as hereinafter more fully described.

In practice the rigid casing is usually constructed in two parts with the anchoring portion 3 integral with the cylindrical portion 2 and with the confining member 4, attached to suitable spacing means such as the ring 7 and retained within the outer cylindrical portion 2. Means such as a deformed edge 8 is provided for fixedly maintaining the anchoring member 3 and the lateral confining member 4 in fixed rigid relation to each other.

The packing or sealing element 5 is molded from a rubber-like material or synthetic rubber compound, which preferably contains finely divided carbon and some graphite and which has a high degree of abrasion resistance. The preferred rubber-like materials are oil resistant, such as copolymers of butadiene and acrylonitrile, polychloroprene and the like.

The packing element 5 is generally of angular shape having a body portion 10, which preferably extends in substantially radial direction and which is bonded to the anchoring element 3 over substantially the entire circumference of the end 11 thereof, which end is preferably inturned as shown in the drawing. Integral with the body portion 10 of the molded sealing element is an axially extending portion 12 which terminates in a sealing edge 13. The sealing edge 13 is adapted to bear against a machine element that is relatively movable thereto.

In the modification shown in Figs. 1 to 3, inclusive, and Fig. 5, the molded annular sealing element or packing ring is substantially centrally apertured and the sealing edge 13 is adapted to bear against the shaft, the cylindrical portion 2 of the casing being adapted to be fixedly held within the housing 15. The sealing face 14, which is adapted to contact the relatively movable machine element such as a shaft or housing and which terminates in the sealing edge 13, is preferably of frusto-conical shape, as shown in Figs. 1 to 4, inclusive.

A pressure ring 6 of resilient, rubber-like material and of sufficient cross section width relative to height to permit deflection by compression without substantial bending is disposed within the reentrant angle between the axially extending portion 12 and the radial portion 10 of the annular sealing element. A peripheral portion of said pressure ring is adapted to bear against the face 17 of the lip or axially extending portion 12, which face is opposite from the face 14 that contacts the relatively movable machine element so that the face 14 is forced against said machine element. The member 6 is preferably relatively softer and more swellable in lubricants than is the material of the sealing element or packing member 5. By selecting the material 6 so that there is a slight amount of swelling, compensation for wear of the sealing lip portion of the seal may be automatically obtained.

In accordance with the present invention, I obtain increased sealing pressure between the sealing edge 13 and the relatively movable machine elements, such as the shaft 20 or the housing 15, by providing rigid means for restraining substantially the entire outer lateral face 19 of the pressure ring 6 or at least a greater portion of the outer face 19 than of the inner face 21 so that outward bulging of the face 19 of the pressure ring is reduced or preferably substantially entirely prevented. This rigid restraining means may consist of the rigid confining member 4 of the casing and of means such as the body portion 10 of the sealing element or a spacing member 25 (Fig. 5) of the casing and bearing against the opposite face of the pressure member for holding the outer lateral face of the pressure member against said confining member.

A space 23 is provided between the opposite or inner lateral face 21 of the pressure member 6 and the body or radially extending portion 10 of the packing element so that a lesser portion of the face 21 is restrained than of the face 19. Thus, deflection of the resilient rubber-like material of the pressure ring 6 more readily occurs adjacent the body 10 than over the sealing edge 13. In fact the maximum pressure required for a given radial deformation of the member 6 thus occurs in the region adjacent the annular confining member 4 and above the sealing edge portion 13. The space 23 may be provided by molding a groove in the body portion 10 as illustrated in Figs. 1 to 4, inclusive, or by providing a spacing member 25 which may be attached to the casing as illustrated in Fig. 5.

The space 23 is important in increasing the flexibility of the seal as it permits bulging of the relatively softer rubber-like material of the pressure ring carried in the re-entrant angle between the lip or axially extending portion 12 and the substantially radial portion 10 of the sealing element. Since the rubber-like material of the member 6 acts as a substantially incompressible fluid, it is seen that the bulging into the space 23 markedly decreases the pressure on that portion of the sealing lip near the radial portion 10. As aforesaid by substantially preventing the bulging of the outer face 19 while permitting bulging of the inner face 21, one obtains a very different load-radial deflection characteristic for the pressure member 6. Thus in my improved seals the force required for deflection of the resilient member directly above the sealing edge 13 is greatest. The maximum desirable pressure is, therefore, obtained on the sealing edge 13 without too greatly increasing the pressure between the entire face 14 and the shaft or relatively movable member.

The packing element 5 is preferably molded so that it is deformed from its molded shape when it is placed against the relatively movable machine element. Thus, in the packing elements shown in Figs. 1 to 3, inclusive and Fig. 5, the central opening is molded somewhat in smaller diameter than the diameter of the shaft; in the external seal shown in Fig. 4, the outer periphery of the lip 12 is molded somewhat larger than the inner diameter of the bore in the housing 15.

It will be seen that the seals of the present invention are relatively easy to assemble with the component parts in correct alignment. They are highly effective over a long period of time in preventing leakage between two relatively movable machine elements, such as a housing and a shaft, particularly since a small amount of swelling of the rubberlike materials of the pressure member tends to compensate for effects due to wearing of the sealing member between the shaft and housing.

Any of the oil-resistant synthetic rubbers, such for example as polychloroprene, copolymers of butadiene with acrylic nitrile, styrene, vinyl chloride, methyl methacrylate, and other resin-forming materials may be suitably compounded and used in forming the molded elements of the present invention. It is intended that the term "rubberlike material" includes such synthetic rubbers as well as natural rubber.

It is also apparent that many modifications of the invention may be made without changing the spirit thereof and it is intended that the invention be limited only by the appended claims.

What I claim is:

1. A fluid-retaining device to seal a space between two relatively movable machine elements comprising an annular, rigid casing, generally U-shaped in cross section, having a cylindrical portion adapted to be fixedly held in fluid-tight relation with one of said machine elements, an anchoring portion extending in a radial direction from said cylindrical portion and an annular confining portion spaced from said cylindrical portion; a centrally apertured molded sealing element of oil-resistant rubberlike material and angle-shaped in cross section, said sealing element having an axially extending portion and a body portion integral with said axially extending portion and extending at an angle therefrom and from an edge portion thereof, the other edge portion of said axially extending portion being unattached and having a sealing edge adapted to bear against a machine element movable relative thereto and to said casing, said body portion being anchored to and being fixedly held in fluid-tight relation with said anchoring portion of said casing; a molded pressure ring of flexible, soft, resilient rubberlike compound and of generally rectangular cross sectional shape disposed within the re-entrant angle between said body portion and said axially extending portion of said sealing element and having one axial face thereof bearing against said axially extending portion of said sealing element, means for confining the opposite axially extending face of said pressure ring against movement away from said axially extending portion of said sealing element by change in diameter to force the sealing edge thereof against the relatively movable machine elements, said pressure ring being circumferentially confined by said casing, and one lateral face thereof bearing against said confining member of said casing to decrease tendency for bulging of the rubberlike material adjacent said face when said pressure ring is compressed by deflection of said axially extending portion of said sealing member, the other lateral face of said pressure ring being restrained against bulging in a lesser amount, whereby the pressure exerted on said axially extending portion over said sealing lip by compression of said pressure ring is increased.

2. In a fluid-retaining device adapted to seal a space between a housing and a shaft and of the type having in combination a rigid casing to be fixedly held in fluid-tight relation with the housing, a centrally apertured molded sealing element generally angle-shaped in cross section and anchored to said casing and in oil-resistant relation therewith, and a pressure member of resilient rubberlike material adapted to be compressed radially by deformation of said sealing element so as to increase the diameter of said aperture and to force a sealing edge of said sealing element against the shaft; rigid restraining means for restraining enlargement of the outer periphery of said pressure member, rigid restraining means for substantially preventing bulging of the outer lateral face of said pressure member nearest the sealing edge of said sealing element, and holding means for holding said outer lateral face against said rigid restraining means but permitting bulging of the inner or other lateral face of said pressure member upon radial compression thereof, contact between said rigid restraining means and said outer face being greater than contact between said holding means and said inner face, whereby increased pressure over said sealing edge may be obtained.

3. A fluid-retaining device to seal a space between two relatively movable machine elements comprising an annular, rigid casing, generally U-shaped in cross section, having a cylindrical portion adapted to be fixedly held in fluid-tight relation with one of said machine elements, an anchoring portion extending from said cylindrical portion and an annular confining portion spaced from said cylindrical portion; a centrally apertured molded sealing element of rubberlike material and angle-shaped in cross section, said sealing element having an axially extending portion and a body portion integral with said axially extending portion and extending radially from an edge portion thereof, the other edge portion of said axially extending portion being unattached and having a sealing edge adapted to bear against a machine element movable relative thereto and to said casing, said body portion being held in fluid-tight relation with said anchoring portion of said casing and being bonded thereto; a molded pressure ring of flexible, soft, resilient rubberlike compound and of generally rectangular cross sectional shape disposed within the re-entrant angle between said body portion and said axially extending portion of said sealing element and bearing against said axially extending portion of said sealing element to force by radial compressive stress in said pressure ring the sealing edge of said sealing element against the relatively movable machine elements, means for circumferentially confining one axially extending face of said pressure ring against change in diameter relative to said machine elements, and one lateral face thereof bearing against said confining member of said casing to decrease tendency for bulging of the rubberlike material adjacent said face when said pressure ring is compressed by deflection of said axially extending portion of said sealing member, the other lateral face of said pressure ring being restrained against bulging in a lesser amount, whereby the pressure exerted on said axially extending portion over said sealing lip by compression of said pressure ring is increased.

4. A fluid-retaining device to seal a space between a housing and a shaft comprising an annular rigid casing, generally U-shaped in cross section, having a cylindrical portion adapted to be fixedly held in fluid-tight relation with said housing, an anchoring portion extending in a radial direction inwardly from said cylindrical portion and an annular confining portion spaced from said cylindrical portion and extending in a radial direction inwardly therefrom; a centrally apertured molded sealing element of oil-resistant rubberlike material and angle-shaped in cross section, said sealing element having an axially extending portion and a body portion integral with said axially extending portion and extending at an angle therefrom and from an edge portion thereof, the other edge portion of said axially extending portion being unattached and having a sealing edge adapted to bear against said shaft, said body portion being molded in contact with said casing and being held in fluid-tight relation with said anchoring portion thereof; a molded pressure ring of flexible, soft, resilient rubberlike compound disposed within the re-entrant angle between said body portion and said axially extending portion of said sealing element, its inner peripheral portions thereof bearing against said axially extending portion of said sealing element to force the sealing edge thereof against said shaft, said pressure ring being of sufficient cross sectional width relative to height to permit substantial radial compression without substantial bending and one generally axially extending face thereof being circumferentially confined by said casing against change of diameter relative to the diameters of said machine elements, and one lateral face thereof bearing against said confining member of said casing to decrease tendency for bulging of the rubberlike material adjacent said face when said pressure ring is compressed by deflection of said axially extending portion of said sealing member, the other lateral face of said pressure ring being restrained against bulging in a lesser amount, whereby the pressure exerted on said axially extending portion over said sealing lip by compression of said pressure ring is increased.

5. A fluid-retaining device to seal a space between a housing and a shaft comprising an annular rigid casing, generally U-shaped in cross section, having a cylindrical portion adapted to be fixedly held in fluid-tight relation with said housing, an anchoring portion extending in a radial direction inwardly from said cylindrical portion and an annular confining portion spaced from said cylindrical portion and extending in a radial direction inwardly therefrom; a centrally apertured molded sealing element of oil-resistant rubberlike material and angle-shaped in cross section, said sealing element having an axially extending portion and a body portion integral with said axially extending portion and extending at an angle therefrom and from an edge portion thereof, the other edge portion of said axially extending portion being unattached and having a sealing edge adapted to bear against said shaft, said body portion being molded in contact with said casing and being held in fluid-tight relation with said anchoring portion thereof; a molded pressure ring of flexible, soft, resilient rubberlike compound disposed within the re-entrant angle between said body portion and said axially extending portion of said sealing element, its inner peripheral portions thereof bearing against said axially extending portion of said sealing element to force the sealing edge thereof against said shaft, said pressure ring being rectangularly shaped and being confined against circumferential expansion by said casing, one lateral face of said pressure ring bearing against said body portion of said sealing element, the other lateral face thereof bearing against said confining portion of said casing, the portion of the lateral face bearing against said body portion being substantially less than the portion of the lateral face bearing against said rigid confining portion of said casing, whereby the stress required to radially compress said pressure member adjacent said confining member is greater than the stress required to radially compress said pressure member adjacent said body portion.

6. A fluid-retaining device to seal a space between a housing and a shaft comprising an annular rigid casing, generally U-shaped in cross section, having a cylindrical portion adapted to be fixedly held in fluid-tight relation with said housing, an anchoring portion extending in a radial direction inwardly from said cylindrical portion and an annular confining portion spaced from said cylindrical portion and extending in a radial direction inwardly therefrom; a centrally apertured molded sealing element of oil-resistant rubberlike material and angle-shaped in cross section, said sealing element having an axially extending portion and a body portion integral with said axially extending portion and extending at an angle therefrom and from an edge portion thereof, the other edge portion of said axially extending portion being unattached and having a sealing edge adapted to bear against said shaft, said body portion being molded in contact with said casing and being held in fluid-tight relation with said anchoring portion thereof; a molded pressure ring of flexible, soft, resilient rubberlike compound disposed within the re-entrant angle between said body portion and said axially extending portion of said sealing element, its inner peripheral portions thereof bearing against said axially extending portion of said sealing element to force the sealing edge thereof against said shaft, means for confining the outer circumference of said pressure ring against expansion, rigid means for preventing substantial bulging of the outer lateral face of said pressure ring, and holding means bearing against the opposite lateral face of said pressure member for holding said outer face against said rigid restraining means but permitting bulging of said opposite lateral face, whereby stress for a given radial deformation of said pressure ring adjacent said outer lateral face is greater than the stress required for the same radial deformation near said inner lateral face.

7. A fluid-retaining device to seal the space between a housing and a shaft comprising an annular rigid casing, generally U-shaped in cross section and adapted to be fixedly held in fluid-tight relation on a shaft; a centrally apertured, molded sealing element of rubberlike material having an axially extending portion and a body portion integral with said axially extending portion and extending inwardly at an angle therefrom and from an edge portion thereof, the other edge portion of said axially extending portion being unattached and having a sealing edge adapted to bear against said housing, said body portion being anchored to and fixedly held in fluid-tight relation with said casing; a molded pressure ring of flexible, soft, resilient rubberlike compound and of a generally rectangular cross sectional shape disposed within the re-entrant angle between said body portion and said axially extending portion of said sealing element to force the sealing edge thereof against said housing; means for confining the inner circumference of said pressure ring to prevent substantial compression of the inner peripheral surface thereof, rigid means for preventing substantial bulging of the outer lateral face of said pressure ring, and holding means bearing against the inner lateral face of said pressure ring for holding said outer face against said rigid restraining means but permitting bulging of said inner lateral face, whereby stress for a given radial deformation of said pressure ring adjacent said outer lateral face is greater than the stress required for the same radial deformation near said inner or opposite lateral face.

HOWARD M. DODGE.